April 21, 1970 J. I. REBOLD 3,507,031
STUD GUN
Filed Dec. 8, 1967 2 Sheets-Sheet 1
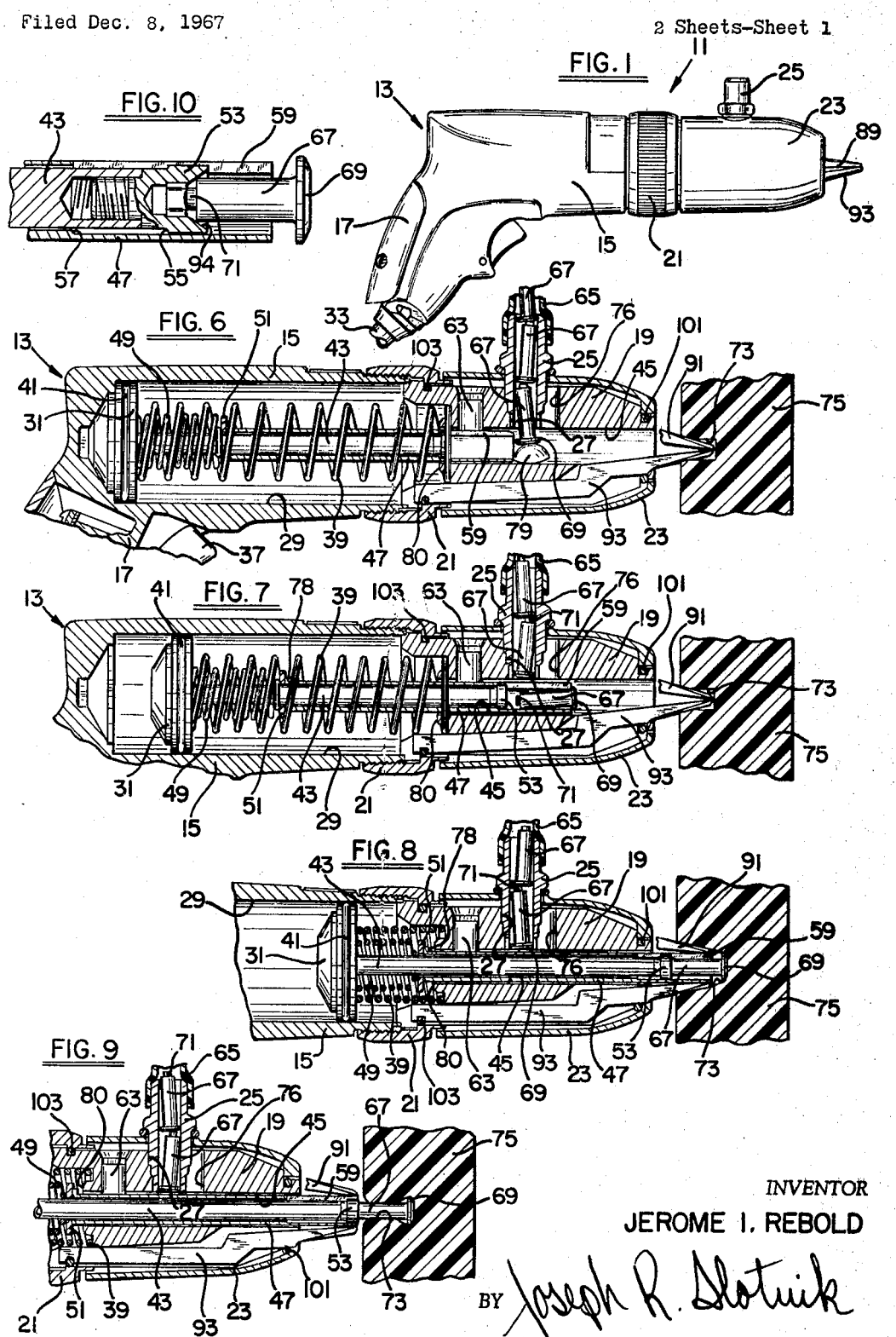
INVENTOR
JEROME I. REBOLD
BY Joseph R. Slotnick
ATTORNEY

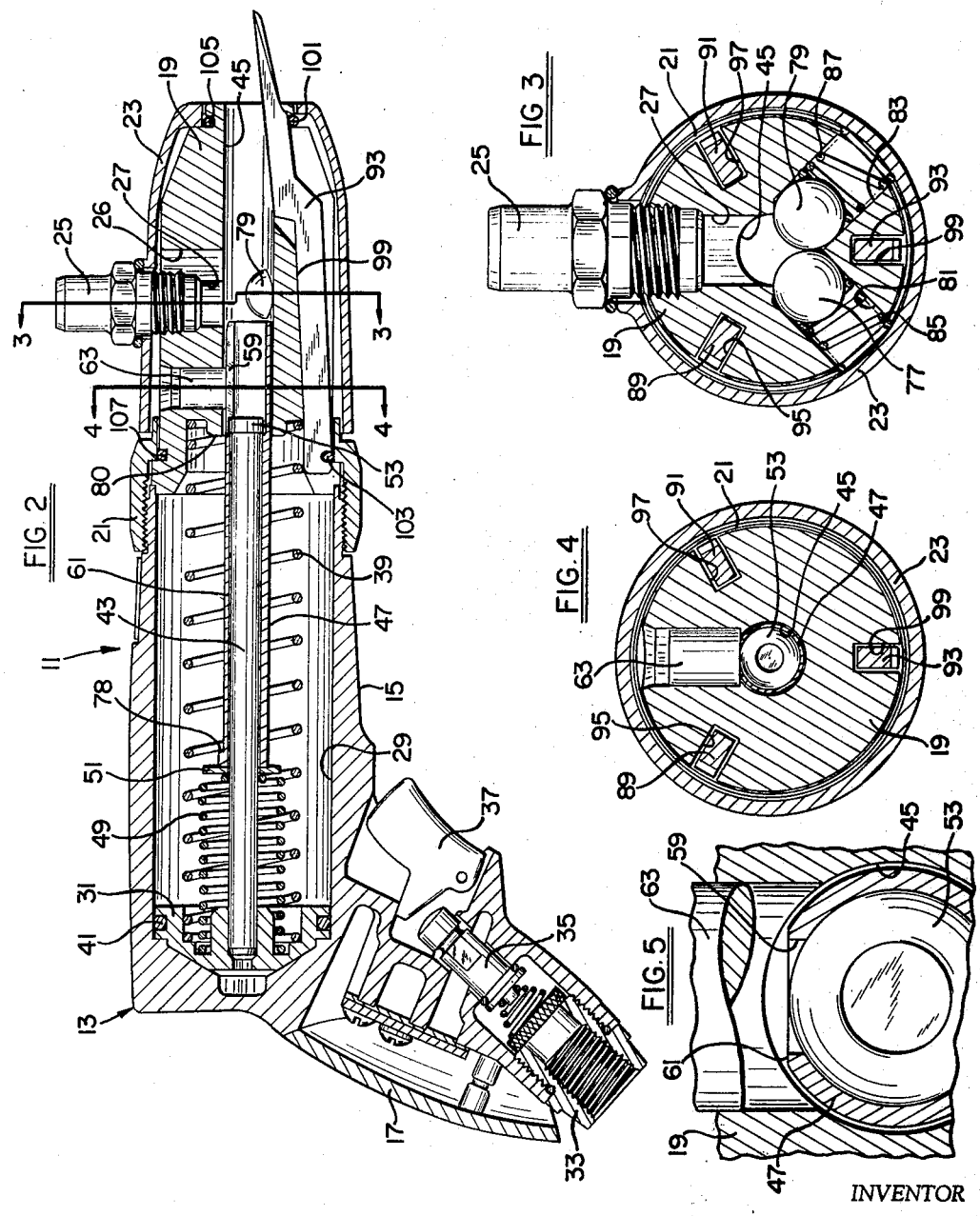

United States Patent Office 3,507,031
Patented Apr. 21, 1970

3,507,031
STUD GUN
Jerome I. Rebold, Baltimore, Md., assignor to The Black and Decker Manufacturing Company, Towson, Md., a corporation of Maryland
Filed Dec. 8, 1967, Ser. No. 689,142
Int. Cl. B23q 7/10
U.S. Cl. 29—212      10 Claims

ABSTRACT OF THE DISCLOSURE

The device disclosed herein includes a housing having a pneumatic motor therein. A rod and sleeve assembly are associated with the motor and are movable generally in response to actuation thereof to respectively orient and insert a stud into a recess in an automotive tire. Means is provided to supply studs to the housing for handling by the sleeve and rod, and additional means automatically prepares the tire recess to receive the stud.

BROAD STATEMENT OF THE INVENTION

The present invention is an improvement in power operated tools adapted to insert one member into another and includes a first means to positively orient the one member ready for insertion and a second means to perform the actual insertion. In a preferred form, the first and second means are, respectively, concentric sleeve and rod means which are movable longitudinally through a bore formed in the housing. A member to be inserted is delivered to the bore for handling by the first means which, in the preferred form, is forwardly of and in the path of movement of the sleeve whereupon movement of the sleeve is effective to orient the member ready for insertion. The rod moves through and relatively to the sleeve and drives the member out of the sleeve and housing bore and into the other member.

Main objects, therefore, of the present invention are to provide an improved, power-operated tool for inserting one member into another which tool is adapted to receive the members to be inserted, automatically and positively orient them and singularly insert them into the other member.

Further important objects are to provide an improved tool of the above character which facilitates easy, reliable, and relatively foolproof operation and which eliminates major causes of wear inherent in tools of this type.

Additional objects are to provide an improved tool of the above character which facilitates automatic delivery of the members thereto without the need for any special or complex feed mechanism.

Still further objects of the present invention are to provide an improved tool of the above character which is relatively inexpensive to manufacture, rugged in construction and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a pneumatically operated stud gun embodying the present invention;
FIG. 2 is an enlarged vertical sectional view of the device of FIG. 1;
FIG. 3 is an enlarged, sectional view of FIG. 2 taken along the line 3—3 thereof;
FIG. 4 is an enlarged, sectional view of FIG. 2 taken along the line 4—4 thereof;
FIG. 5 is an enlarged view of a portion of FIG. 4 and shown with parts broken away for clarity;
FIGS. 6, 7, 8 and 9 are fragmentary sectional views illustrating the sequence of operations of the stud gun embodying the present invention, from the position of the parts "at rest" through to full insertion of a stud in an automotive tire; and
FIG. 10 is an enlarged, fragmentary, sectional view illustrating a stud in position in the tube and after engagement by the rod pursuant to insertion into the tire.

Broadly described, the present invention relates to a tool for inserting studs into automobile tires comprising a housing having a longitudinal bore opening to one end thereof, a passage communicating with said bore and adapted to deliver said studs at an angle to said bore, a rod adapted for longitudinal movement in said bore from a first position rearwardly of said passage to a second position where its forward end extends beyond said housing one end, a sleeve slidably receiving said rod and slidable in said bore from a first position where its forward end is between the forward end of said rod and said passage to a second position where its forward end is beyond said housing one end, means adapted to move said sleeve past said passage to pick up and rotate one of said studs and positively orient it in said bore ready for insertion into said tire, means for moving said rod relative to said sleeve to drive said oriented stud into said tire.

In another aspect, the present invention relates to a tool for inserting a first member into a second member comprising a housing, an opening in said housing extending inwardly from one end thereof and adjacent said second member, a passage communicating with said opening for delivering said first members at an angle to said opening, positioning means in said opening adapted to locate a first one of said members in a predetermined position in said opening, first movable guide and orienting means movable along said opening and operable to positively engage and rotate and thereby orient said positioned first one of said first members in said opening, second movable means movable along said opening and adapted to engage and drive said oriented first member into said second member.

DETAILED DESCRIPTION

Referring now more specifically to the drawings, a pneumatically operated stud gun for inserting metal studs into tires and embodying the present invention is illustrated generally at 11 in FIGS. 1 and 2. However, it is to be understood that this particular gun is illustrative only and that the present invention will find use in the broad class of power-operated tools which drivingly insert one member into another and whether the tool be powered pneumatically, electrically, hydraulically or otherwise.

With this in mind, the stud gun 11 is seen to include a main housing 13 having a motor housing portion 15 and a dependent handle portion 17. As shown in FIG. 2, a barrel 19 seats snugly against the forward end of the motor housing portion 15 and is held in place thereagainst by a collar 21 threaded on the motor housing portion 15. A barrel cover 23 fits over the barrel 19 and is held in place thereon by a fitting 25 threaded into a key shaped passage 27 in the barrel 19.

A pneumatic motor is formed by and disposed within the motor housing portion 15 and is seen to include a cylinder bore 29 in the motor housing portion 15 and extending longitudinally thereof and having a piston 31 slidable therein. Pressurized air is adapted to be admitted to the bore 29 behind the piston 31 from a source (not shown) through conduit means 33 and is controlled by a valve 35 and trigger 37 carried by the handle portion 17. When pressurized air is so admitted, the piston 31 is caused to move toward the right, as seen in FIG. 2. When the pressure is released, as by releasing the trigger 37, the piston 31 is returned toward the left under the force of a compression spring 39 caged between the piston 31 and the barrel 19. An O-ring 41 carried by the piston 31 engages the cylinder bore 29 and prevents air pressure leakage therepast.

A piston rod 43 has one end fixed to the piston 31, as by being pressed therein, and has its other end extending loosely into a bore 45 formed in the barrel 19. A sleeve 47 is telescoped over the piston rod 43 and has its forward end slidably disposed in the bore 45. A compression spring 49 is caged between the piston 31 and a washer 51 abutted against the sleeve 47 so that the sleeve 47 tends to move with the piston rod 43 when the piston 31 is moved toward the right, as seen in FIG. 2. An outer, removable end 53 on the piston rod 43 has a generally radially outwardly extending shoulder 55 thereon (FIG. 10) adapted to engage a shoulder 57 on the sleeve 47 to retain sleeve against the force of spring 49 and to move the sleeve 47 toward the left during piston retraction. The top of the sleeve 47 is slotted at its forward end at 59, for a purpose to be described, and the sleeve 47 has an upper, flattened surface 61 (FIG. 5) which cooperates with a flat bottomed plug 63 carried by the barrel 19, to maintain the slot 59 facing upwardly at all times.

Referring now to FIGS. 6–10, a plurality of tire studs 67 are shown associated with the gun 11. As seen there, the studs 67 are generally cylindrical in configuration and include an enlarged head 69 at one end and a projecting, carbide tip 71 at the other, and are delivered through a feed tube 65 to the fitting 25 in a "head-down" position. The leading or bottom stud 67, which is partly in the passage 27 and partly in the bore 45, is engaged by the sleeve 47 as it begins moving forwardly through the bore 45 to positively orient this stud 67 pursuant to insertion thereof into a recess 73 in an automotive tire casing 75. An elongated clearance portion 76 of the key shaped passage 27 in the barrel 19 permits the stud 67 to swing or pivot from the position shown in FIG. 6 to that shown in FIG. 7. As the stud so swings, its body drops through the slot 59 in the sleeve 47. Thereafter, the piston rod 43 moves through the sleeve 47 and drives the stud 67 out of the sleeve 47 and into the tire recess 73. The flattened surface 61 on the sleeve 47 terminates near the rear or left-hand end thereof and forms a shoulder 78 which is positioned to engage the plug 63 to prevent excessive movement of the sleeve 47. In addition, a shoulder 80 on the barrel 19 limits movement of the washer 51 in a forward or right-hand direction.

As shown in FIGS. 3 and 5, a pair of balls 77, 79 normally extends into the bore 45 in general alignment with the fittings 25 and opposite thereof to prevent the leading studs 67 from falling out of the passage 27 and completely into the bore 45 before the sleeve 47 begins advancing. In addition, the balls 77, 79 prevent damage to the wall of the bore 45 as the leading stud 67 falls therein from the fitting 25 and passage 27. These balls 77, 79 are disposed in radial passages 81, 83 in the barrel 19 and are biased toward the bore 45 by compression springs 85, 87, respectively. The inner ends of the passages 81, 83 are restricted to prevent the balls 77, 79 from moving wholly into the bore 45. During forward movement of the sleeve 47, it engages the balls 77, 79 and cams them out of the bore 45 so that the sleeve 47 can move freely through the bore 45 and the leading stud 67 can be swung into position by the sleeve 47.

A plurality of, and preferably three, elongated fingers 89, 91, 93 are disposed in generally axially extending recesses 95, 97, 99 formed in the barrel 19 (see FIGS. 2 and 3). The fingers 89, 91, 93 have outer ends which extend beyond the barrel cover 23 and which outer ends are held in close, proximate relation by an elastic ring 101, surrounding the fingers near their forward ends and seated in an annular groove 105 in the barrel 19. A rigid, relatively inelastic ring 103 surrounds the inner ends of the fingers 89, 91, 93 and seats in an annular groove 107 in the barrel 19 to provide a fixed pivot point for each of the fingers 89, 91, 93. The outer ends of the fingers 89, 91, 93 are adapted to fit into the tire recess 73 so that when the sleeve 47, the rod 43 and the stud 67 are moved through the bore 45, the outer ends of the fingers 89, 91, 93 are engaged by the stud head 69 and are cammed apart pivoting about the axis at the ring 103, as shown in FIGS. 7 and 8, to both open-up the tire recess 73 to receive the stud 67 as well as to permit the stud 67 to be inserted into the tire recess 73. Thereafter, when the sleeve 47 and piston rod 43 are withdrawn, the fingers 89, 91, 93 close under the force of the ring 101.

As described above and shown in FIG. 8, the fingers 89, 91, 93 swing or pivot substantially at the ring 103 when they are cammed apart by the advancing stud head 69. This pivot point is spaced considerably from the outer, cammed portions of the fingers 89, 91, 93 so that minimum force is required to spread or cam-open the fingers. This is desirable in that it reduces wear on the fingers 89, 91, 93.

In operation, a suitable number of studs 67 are placed in the tube 65 and fitting 25 in a head-down position. At rest, the parts of the gun including the piston 31 and the sleeve 47 are as shown in FIGS. 2 and 6 so that the leading or bottom stud 67 rests with its head 69 upon the balls 77, 79. The gun 11 is then positioned adjacent a tire to be "studded" with the outer, proximate ends of the "closed" fingers 89, 91, 93 fitted into a tire recess 73. The operator then pulls the trigger 37 causing the valve 35 to open and air pressure to enter the cylinder bore 29 behind the piston 31. This causes the piston 31 and the piston rod 43 to begin moving toward the right, as seen in the figures, against the force of the spring 39. At this point, the sleeve 47 also moves with the piston 31 through the action of the spring 49 and, as described above, cams the balls 77, 79 out of the bore 45. As the sleeve 47 moves toward the right, it engages the leading stud 67, and specifically its head 69 which is larger than the inner diameter of the sleeve 47, and begins to orient this stud 67 in preparation for inserting into the tire casing 75. This, together with the withdrawal of the balls 77, 79 from the bore 45, causes this stud 67 to swing in a counter clockwise direction, as seen in FIGS. 6 and 7, and as allowed by the elongated portion 76 of the key shaped passage 27, with the body of the stud 67 falling through the slot 59 in the top of the sleeve 47. The position of the parts now is as illustrated in FIG. 7 so that the stud 67 is carried by and with the sleeve 47 toward the tire casing 75. The sleeve 47, at this time, has moved past the fitting 25 and prevents the next stud 67 from falling into the bore 45 since the sleeve slot 59 has a smaller lateral dimension than the diameter of the stud head 69.

The piston rod 43 and sleeve 47 move together toward the right as seen in FIGS. 6–9 whereupon the head 69 of the stud 67, carried by the sleeve 47, engages the outer closed ends of the fingers 89, 91, 93. This acts to resist movement of the sleeve 47 in a right-hand direction so that now, the piston rod 43 moves more rapidly than and relative to the sleeve 47 with continued right-hand advancing movement of the piston 31. With this movement then, the stud 67 is completely oriented and ready for insertion.

The piston rod end 53 has a conical recess 94 which engages the rear end of the stud 67 and drives it toward the right so that the stud head 69 cammingly forces the outer ends of the fingers to spread apart in a radial direction and the tire casing recess 73 to open upon, as shown substantially in FIG. 8, in preparation for receiving the stud 67. As the stud 67 advances and the outer ends of the fingers 89, 91, 93 spread apart, the sleeve 47 follows along, under the force of the spring 49, until it extends substantially to the tips of the fingers 89, 91, 93 while the stud head 69 is outwardly therebeyond. The stud 67 is now seated in the tire casing recess 73, as shown in FIG. 8, and, upon doing so, directs a reaction back to the gun 11 which serves to withdraw the fingers 89, 91, 93 from the recess 73, as shown in FIG. 9. Thereafter, when the operator releases the trigger 37, the springs 39, 49 take over and return the piston 31, piston rod 43 and sleeve 47 to the position shown in FIG. 6. As soon as the sleeve 47 retracts past the balls 77, 79, they are moved into the bore 45 by the springs 85, 87 and the next stud 67 drops into the bore 45 and rests on the balls 77, 79, as shown in FIG. 6. The gun is now moved by the operator to position the outer ends of the fingers 89, 91, 93 in the next tire casing recess 73 and the operation is repeated.

It will be appreciated that when positively oriented by the sleeve 47, each stud 67 is disposed in general axial alignment with the rod 43. Thus, when the conical end 53 of the rod 43 advances into engagement with the rear or tip end of the stud 67, little or no "scooping" of the stud 67 is required to set the stud 67 in direct axial alignment with the rod 43, as is shown best in FIG. 10.

This may be contrasted with the prior art devices which provided no positive orienting means for the studs. There, the rear or tip ends of the studs must be 'scooped" by a conical rod end pursuant to insertion into a tire casing. In order to achieve this, considerable force is exerted between the rod end and the stud which results in substantial wear of the rod.

In addition, these studs generally employ a carbide tip, such as that illustrated at 71 in FIG. 10, which tip 71 would inflict even greater wear on the end of the rod 43 if substantial "scooping" action be required. Thus, the positive orientation of the stud 67 by the sleeve 47 of the present invention effectively eliminates this problem. Furthermore, since the rod end 53 is removable, it may be replaced easily and inexpensively should wear thereof occur.

It will be further appreciated that no special feed mechanism is required to deliver the studs 67 to the gun 11. These studs 67 need only be dropped into the tub 65 in the "head down" position and thereafter gravity is sufficient to deliver them to the bore 45. Also, the balls 77, 79 prevent peening of the bore 45 as the studs 67 drop therein, and the sleeve 47 automatically orients the studs 67 and readies them singularly for insertion into the tire casing 75. The studding operation is virtually automatic and this is accomplished with a minimum of parts and controls which therefore provides a highly advantageous device.

By the foregoing, there has been disclosed an improved, power operated, inserting tool calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. A tool for inserting studs into automobile tires comprising a housing having a longitudinal bore opening to one end thereof, a passage communicating with said bore and adapted to deliver said studs at an angle to said bore, a rod adapted for longitudinal movement in said bore from a first position rearwardly of said passage to a second position where its forward end extends beyond said hosuing one end, a sleeve slidably receiving said rod and slidable in said bore from a first position where its forward end is between the forward end of said rod and said passage to a second position where its forward end is beyond said housing one end, means adapted to move said sleeve past said passage to pick up and rotate one of said studs and positively orient it in said bore ready for insertion into said tire, means for moving said rod relative to said sleeve to drive said oriented stud into said tire.

2. A device as defined in claim 1 wherein said sleeve has a slot at its forward end and aligned with said passage, said studs including a body portion having a smaller lateral dimension than said slot and a head portion larger than the lateral dimension of said sleeve, said passage having an elongated clearance portion extending forwardly thereof, said studs being delivered to said bore in tandem fashion with each in a head-first position, said sleeve, when moved past said passage, adapted to engage the head of the first one of said studs and swing said stud head forwardly whereupon said stud body drops through said slot and into said sleeve.

3. A device as defined in claim 2 which includes means carried by said housing and cooperating with said sleeve to prevent turning movement thereof.

4. A device as defined in claim 1 which includes means in said bore opposite said passage for supporting said studs and preventing them from moving completely into said bore as each stud is initially delivered thereto, said sleeve being adapted to engage and move said support means out of said bore as said sleeve moves toward said housing one end.

5. A device as defined in claim 1 which includes resilient means interconnecting said rod and sleeve for moving said sleeve with said rod when said rod is moving toward said housing one end and for permitting relative movement between said rod and sleeve, a plurality of fingers carried by said housing and each having an outer portion extending beyond and generally aligned with said bore, resilient means normally holding said finger outer portions in close proximate relation, said fingers being engaged by said stud when said stud is oriented in said bore by said sleeve, said finger outer portions adapted to be spread apart as said rod and the stud engaged thereby advance toward said housing one end, said resilient means allowing said rod to advance at a faster rate than said sleeve during engaging advance of said rod and stud, whereby said rod moves relative to said sleeve to drive said stud out of said sleeve into said tire.

6. A tool for inserting a first member into a second member comprising a housing, an opening in said housing extending inwardly from one end thereof and adjacent said second member, a passage communicating with said opening for delivering said first members at an angle to said opening, positioning means in said opening adapted to locate a first one of said members in a predetermined position in said opening, first movable guide and orienting means movable along said opening and operable to positively engage and rotate and thereby orient said positioned first one of said first members in said opening, second movable means movable along said opening and adapted to engage and drive said oriented first member into said second member.

7. A device as defined in claim 6 wherein said positioning means includes ball means normally biased into said opening opposite said passage to prevent complete entry of said first one of said first members into said opening, said ball means being retractable out of said opening upon engagement by said first movable guide and orienting means as it engages and orients said first one of said first members.

8. A device as defined in claim 6 which includes compression spring means interconnecting said first movable guide and orienting means and said second movable means to permit relative movement therebetween after said first movable guide and orienting means has positively oriented said first one of said first members.

9. A device as defined in claim 6 which includes a plurality of fingers carried by said housing and each having an outer portion extending beyond and generally aligned with said opening, resilient means normally holding said finger outer portions in close proximate relation, said fingers being engaged by said first members as they are oriented by said first movable guide and orienting means, said finger outer portions being adapted to be spread apart as said second movable means and the first member engaged thereby advance toward said housing one end, said first movable guide and orienting means being caused to advance at a rate different from that of said second movable means during engaging advance of said second movable means and first member, whereby said second movable means moves relative to said first movable guide and orienting means to drive said first member out of said first movable guide and orienting means and into said second member.

10. A device as defined in claim 1 which includes a pneumatic motor in said housing and having a piston connected to said rod and movable under air pressure toward said housing one end, and spring means for moving said piston in the other direction.

References Cited

UNITED STATES PATENTS

| | | | |
|---|---|---|---|
| 2,604,692 | 7/1952 | Broden | 29—208 |
| 3,258,835 | 7/1966 | Boggild. | |
| 3,348,291 | 10/1967 | Niedzwiecko. | |
| 3,387,352 | 6/1968 | Walter. | |
| 3,398,446 | 8/1968 | Karlsson. | |

FOREIGN PATENTS

| | | |
|---|---|---|
| 1,948,508 | 10/1966 | Germany. |
| 1,955,647 | 2/1967 | Germany. |

THOMAS H. EAGER, Primary Examiner

U.S. Cl. X.R.

29—235